June 26, 1945.  P. W. THORNHILL  2,379,388
LIQUID DAMPED TELESCOPIC SHOCK ABSORBER
Filed Jan. 11, 1943
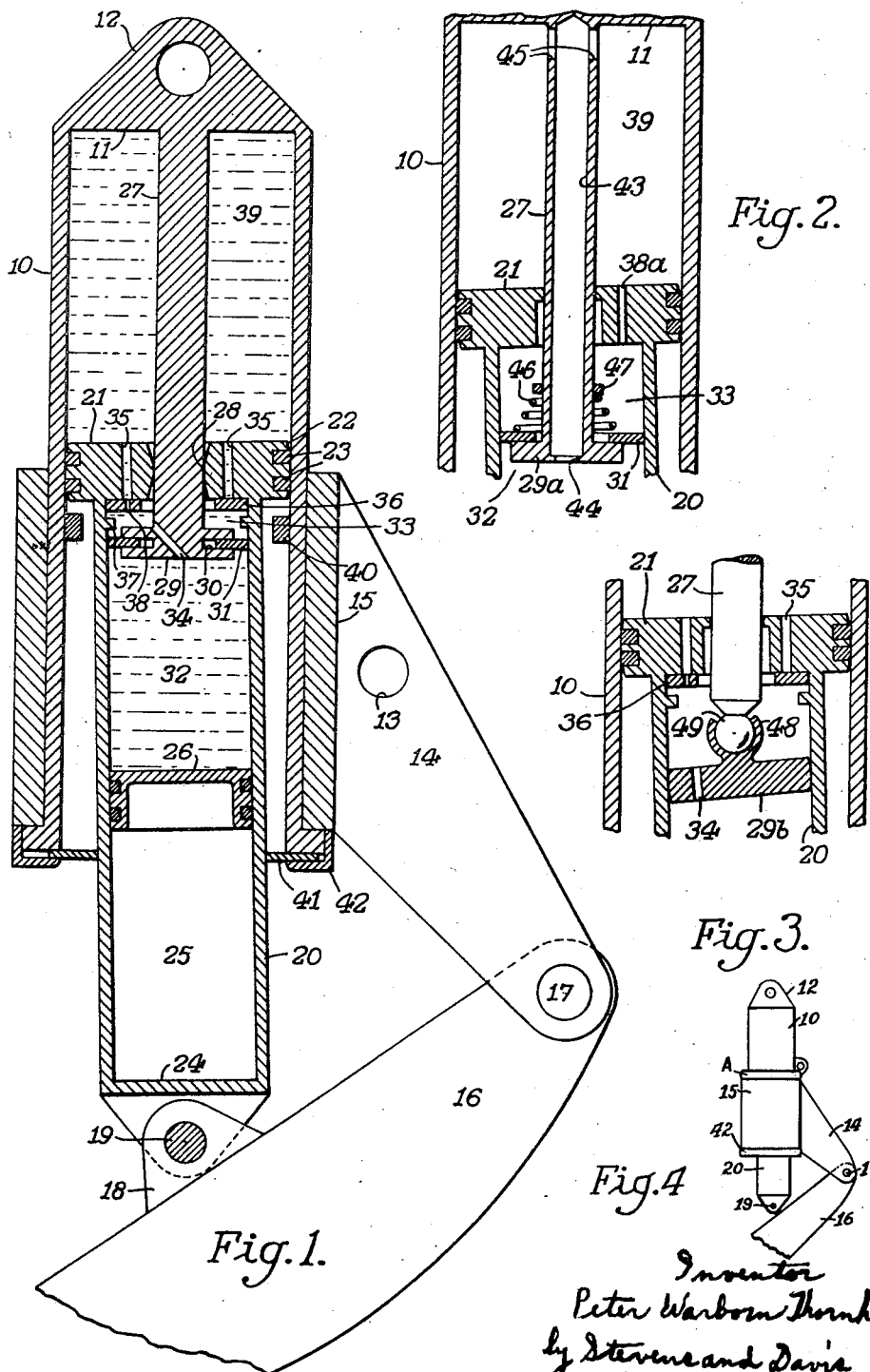

Patented June 26, 1945

2,379,388

UNITED STATES PATENT OFFICE 2,379,388

LIQUID DAMPED TELESCOPIC SHOCK
ABSORBER

Peter Warborn Thornhill, Leamington Spa, England, assignor to John Henry Onions, Coventry,
England Application January 11, 1943, Serial No. 472,042
In Great Britain January 23, 1942

9 Claims. (Cl. 267—64)

This invention relates to liquid damped telescopic shock absorbers, and it has for its object to provide constructional improvements which are useful in cases where it is desired that the plunger member or equivalent of the telescopic shock absorber shall be adapted to have a substantial amount of freedom to move in a lateral direction relative to the usual cylinder. The invention is of particular utility where the usual cylinder is fixed and the plunger member or equivalent is connected pivotally to a member which moves angularly so that the point of attachment of the plunger member or equivalent to said member travels along an arcuate path.

It is a further object of the invention to provide an exceptionally simple form and construction of oleo-pneumatic shock absorber which is particularly suitable for use in the landing gear of aircraft. It will, however, be understood that the improved shock absorber may be used as a suspension unit for road and other vehicles.

In a liquid damped telescopic shock absorber in which a tubular plunger member having a piston at its inner end rocks relative to a cylinder as the piston slides within said cylinder, the present invention is characterized by the fact that a recoil damping piston, connected to the cylinder by a longitudinal stem extending into the plunger member, is slidable within the plunger member, and means are provided to enable the recoil damping piston to accommodate itself to variable eccentricity of the plunger member.

There is further provided according to the invention a liquid damped telescopic shock absorber comprising in combination a cylinder closed at one end, a tubular plunger member extending into the cylinder and having a piston head at its inner end, the other end of the plunger member being closed, a stem secured to the closed end of the cylinder and extending through the piston head into the plunger member, a recoil damping piston carried by the end of said stem, and means for enabling the recoil piston to occupy an eccentric position with respect to the bore of the cylinder.

As another aspect of the invention, a liquid damped telescopic shock absorber is provided comprising in combination a cylinder closed at one end, a tubular plunger member extending into the cylinder and having a piston head at its inner end, the other end of the plunger member being closed, a stem extending from the closed end of the cylinder through the piston head and into the plunger member, a recoil damping piston disposed within the plunger member and carried by the stem, means for enabling the recoil piston to occupy an eccentric position with respect to the bore of the cylinder, a floating piston slidable within the plunger member between the recoil damping piston and the closed outer end of the plunger member, and a damping valve device arranged to restrict the flow of damping liquid from the plunger member to the cylinder.

The recoil damping piston can conveniently comprise an annular disc which is disposed within a groove formed in the stem or in a member carried thereby, said disc being located against axial movement but being free to move radially to accommodate itself to rocking movements of the plunger member, while in an alternative arrangement the recoil damping piston comprises an annular disc which engages a head formed upon the stem and is radially slidable relative to said stem so as to permit the plunger member to rock within the cylinder. In a still further modification the recoil damping piston is slidably mounted in the plunger member and is connected with the stem by means of a pivotal joint, conveniently of the universal type.

The invention is illustrated by way of example in the accompanying diagrammatic drawing, in which—

Figure 1 is a sectional side elevation of one form of shock absorber;

Figure 2 is a fragmentary sectional elevation showing a modified construction of stem and recoil damping piston;

Figure 3 is a view similar to Figure 2 but showing a still further modification; and Figure 4 is a view in elevation similar to Figure 1 but disclosing a castoring mounting wherein the plunger is rotatable relative to the cylinder.

The shock absorbing device shown in Figure 1 comprises a tubular cylinder 10, the top of which is closed by an upper wall 11 having an integral lug 12 by which the shock absorbing device is attached to the aircraft or equivalent, usually in a rigid manner, a second fixing joint being provided by a hole 13 formed in a depending lug 14, which latter is secured to a sleeve 15 fastened to the lower part of the cylinder 10. A lever 16 is pivoted at 17 to the lug 14 and carries a wheel or like landing member (not shown) at its free end.

The lever 16 is formed intermediate its length with a lug 18 to which is pivotally attached at 19 a plunger member 20 which extends upwardly within the cylinder 10 and is also tubular in form. The plunger member 20 is smaller in diameter than the cylinder 10 so as to be able to rock from side to side and thus compensate for the curved path taken by the pivot 19 as the lever 16 moves up and down. The upper end of the plunger member 20 is, however, fitted with a piston head 21 which is part-spherical at its outer surface, as indicated at 22, so that it can rock within the cylinder 10 and at the same time have a smooth sliding fit therein; a substantially liquid tight joint is obtained by the provision of a pair of resilient packing rings 23. The lower end of the plunger member 20 is closed by a wall 24 to form a space 25 for compressed air, said space being bounded by a floating piston 26.

A stem 27 extends downwards axially from the wall 11 of the cylinder 10 and passes through an aperture 28 in the piston head 21, said aperture being enlarged at its upper and lower parts, as indicated, so as to permit the rocking movement of the piston head 21. The lower end of the stem 27 is formed with a head 29, which latter is grooved circumferentially at 30 for the accommodation of an annular disc 31, the hole in the disc being larger in diameter than the "bottom" of the groove 30 so as to enable said disc to slide radially relative to the stem 27 as the plunger member 20 rocks from side to side. The outer periphery of the disc 31 is arranged to slide snugly within the plunger member 20 and said disc 31, in conjunction with the head 29, constitutes a recoil damping piston separating a liquid space 32 below the piston from a liquid space 33 disposed between said recoil damping piston 29, 31 and the piston head 21; the liquid spaces 32 and 33, are however, in communication with one another through a constricted by-pass passage 34. The piston head 21 is formed with a plurality of liquid passages 35 which are controlled by an annular damping valve member 36 having its downward opening movement limited by a stop flange 37; one or more constricted passages 38 are formed in the damping valve member 36 so that even when the latter is in its raised position liquid is able to flow at a very limited rate into the cylinder space, which is indicated at 39 and which is full of liquid. It will, of course, be understood that in the axial shock absorbing device a plug or equivalent fitting (not shown) would be provided in the cylinder 10 for the insertion of the damping liquid and an air inlet valve (not shown) would similarly be fitted to the lower part of the plunger member 20 to enable compressed air to be pumped in until the requisite internal pressure is obtained for supporting the normal load to be carried by the device. Downward movement of the plunger member 20 is limited by a stop which is indicated diagrammatically at 40, while in order to protect the working parts from dirt and other foreign matter the lower part of the plunger member 20 slides snugly through an annular disc 41, which latter is located in a housing 42 arranged to permit said disc to have a requisite sliding movement in a radial direction, thus enabling the plunger member 20 to rock within the cylinder 10.

The operation of the shock absorbing device shown in Figure 1 is as follows. When the wheel or equivalent encounters a bump the lever 16 rises, thus causing liquid to be expelled fairly readily through the passages 35, past the open damping valve 36 and into the space 33. This space 33, although it is expanding, cannot hold all the liquid expelled from the cylinder space 39 and therefore some of the liquid flows through the by-pass passage 34 into the space 32. This liquid presses down the floating piston 26 and at the same time the plunger member 20 is rising (relative to the cylinder 10 and the recoil damping piston 29, 31) so that the air disposed in the space 25 has its pressure raised quite considerably. During the recoil stroke the plunger member 20 tends to move downwards and if it were not for the recoil damping piston 29, 31 such movement could occur fairly easily, a partial vacuum being formed in the cylinder space 39. However, in the improved shock absorbing device the downward movement is limited by the rate at which the liquid from the space 32 can escape through the constricted opening or openings 38 in the damping valve member 36, which latter, of course, assumes its upper closed position immediately the downward movement of the plunger member 20 commences.

The modified form of recoil damping piston shown in Figure 2 is arranged as a valve performing the functions of the damping valve 36 in Figure 1. For this purpose the annular disc 31 rests upon a plain flange 29a constituting a head upon the stem 27. The latter is formed with an axial bore 43, having a damping constriction 44 at its lower end, and communicating with the cylinder space 39 by way of openings 45. The annular disc 31 is, as before, free to move radially relative to the head 29a and is normally held in contact therewith by an axial compression spring 46 which bears at its upper end against a projecting flange 47. The piston head 21 is formed with one or more damping passages, one of which is indicated at 38a. During operation, upward movement of the flange member 20 causes liquid to be forced from the cylinder space 39 through the openings 45, bore 43, and constriction 44 to the liquid space 32 below the recoil damping piston 29a; 31; during this movement, of course, the space 33 becomes enlarged and liquid is readily able to flow thereinto from the space 32 by lifting the disc 31 away from the head 29a. When recoil occurs, however, the liquid is trapped within the space 32 and can only escape at a relatively slow rate by flowing through the constriction or constrictions 38a into the cylinder space 39, thus positively retarding the downward movement of the plunger member 20 relative to the cylinder 10.

The arrangement shown in Figure 3 functions in the same manner as that shown in Figure 1 but includes an alternative mechanical arrangement of the recoil damping piston. This piston, which is indicated at 29b, is arranged to fit snugly within the plunger member 20 and has its external grooved surface shaped part-spherical so that the piston member 29b is able to rock or tilt within the plunger member 20 and at the same time maintain a reasonable liquid tight fit therein. From its upper surface projects a socket 48 which, in conjunction with a ball member 49, constitutes a universal joint connecting the recoil damping piston 29b with the stem 27. It will be noted that the centre of the ball 49 is displaced axially to a considerable extent with respect to the general plane of the recoil damping piston 29b and this, of course, is necessary for it permits the plunger member 20 to rock within the cylinder 10; it will be realised that as the plunger member 20 moves to one side the ball 49 becomes eccentrically disposed with respect to the plunger member 20 and therefore the recoil damping piston 29b tilts over to accommodate this eccentricity. In cases where the rocking movement of the plunger member 20 is confined to a single plane the universal joint 48, 49 may be substituted by a simple pivotal point having its axis at right angles to that plane.

It will, of course, be understood that the constructions which have been described are given merely by way of example and that various modifications may be made. For instance, it is conceivable that the device can be arranged to serve as a castoring mounting for a tail wheel or the like by fastening the cylinder 10 to the aircraft fuselage and arranging for the sleeve 15 to be rotatable upon said cylinder. This may be done as shown in Figure 4 by providing a collar or other abutment A to prevent vertical displacement of sleeve 15.

What I claim is:

1. In a liquid damped telescopic shock absorber including a cylinder, a tubular plunger and a piston on the inner end of said plunger, said piston fitting in said cylinder for rocking movement and defining therewith a primary working space; the combination which comprises a stem rigid with said cylinder and extending through said piston into said tubular plunger, and a member which is slidable within the tubular plunger and is carried by the stem with freedom to move laterally relative to said stem as the plunger rocks within the cylinder, said slidable member defining with said tubular plunger and said piston a secondary working space, for establishing free communication between said primary and second working spaces under compression and restricted communication therebetween under extension.

2. In a shock absorber as claimed in claim 1, a floating piston subdividing the tubular plunger between its outer end and said slidable member into two zones, the zone most remote from said means having air therein.

3. In a shock absorber as claimed in claim 1, a head upon the lower end of the stem and a coiled compression spring urging the slidable member into engagement with the upper surface of said head, the slidable member being in the form of an annular plate having its outer edge slidable snugly within the plunger tube, while its inner edge is a loose fit on the stem to permit said slidable member to move laterally relative to the stem as the plunger rocks.

4. In a liquid damped telescopic shock absorber including a cylinder, a tubular plunger and a piston on the inner end of said plunger, said piston fitting in said cylinder for rocking movement and defining therewith a primary working space; the combination which comprises a stem rigid with said cylinder and extending through said piston into said tubular plunger, a damping piston mounted on the end of said stem with freedom to move laterally relative to the stem as the plunger rocks within the cylinder, said damping piston defining with said piston and said tubular plunger a secondary working space, and a check valve for establishing free communication between said primary and secondary working spaces under compression and restricted communication therebetween under extension.

5. In a shock absorber as claimed in claim 4, in which the piston is provided with a plurality of apertures connecting the primary and secondary working spaces, said check valve comprising an annular member of an external diameter substantially equal to the internal diameter of the plunger and of an internal diameter greater than the diameter of the stem and having therein restricted orifices for registry with the apertures in the piston, and means limiting the axial movement of said annular member in said tubular plunger.

6. In a liquid damped telescopic shock absorber including a cylinder, a tubular plunger and a piston on the inner end of said plunger, said piston fitting in said cylinder for rocking movement and defining therewith a primary working space; the combination which comprises a stem rigid with said cylinder and extending through said piston into said tubular plunger, said stem having an annular slot therein adjacent its inner end, said slot being in a plane normal to the long axis of said cylinder, an annular washer in said slot having an internal diameter greater than the diameter of that portion of the stem defining the bottom of the slot, said washer defining a secondary working space, and a check valve for establishing free communication between said primary and secondary working spaces under compression and restricted communication therebetween under extension.

7. In a liquid damped telescopic shock absorber including a cylinder, a tubular plunger and a piston on the inner end of said plunger, said piston fitting in said cylinder for rocking movement and defining therewith a primary working space; the combination which comprises a stem rigid with said cylinder and extending through said piston into said tubular plunger, a ball on the end of said stem, a damping piston, said damping piston having a socket cooperating with said ball so that said piston is capable of limited universal movement, said damping piston defining with said piston and said tubular plunger a secondary working space, and a check valve for establishing free communication between said primary and secondary working spaces under compression and restricted communication therebetween under extension.

8. In a shock absorber as claimed in claim 7 in which the periphery of said damping piston is partly spherical.

9. In a liquid damped telescopic shock absorber including a cylinder, a tubular plunger and a piston on the inner end of said plunger, said piston fitting in said cylinder for rocking movement and defining therewith a primary working space; the combination which comprises a stem rigid with said cylinder and extending through said piston into said tubular plunger, a radially extending flange on the inner end of said stem, an annular member surrounding said stem and resting on said flange, said annular member having an external diameter approximately equal to the internal diameter of the tubular plunger and an internal diameter greater than the external diameter of the stem, resilient means normally biasing said annular member against said flange, said annular member dividing said tubular plunger into upper and lower secondary working spaces, said primary working space being in communication with said lower secondary working space through said stem, said upper secondary working space being in restricted communication with said primary working space through said piston whereby said annular member may function as a check valve, preventing communication between said secondary working spaces upon extension of the shock absorber and establishing communication therebetween upon compression thereof.

PETER WARBORN THORNHILL.